US012395785B2

(12) United States Patent
Cao et al.

(10) Patent No.: US 12,395,785 B2
(45) Date of Patent: Aug. 19, 2025

(54) BONE CONDUCTION ACOUSTIC DEVICE AND WEARABLE DEVICE

(71) Applicant: Suzhou Thor Electronic Technology Co., Ltd., Jiangsu (CN)

(72) Inventors: Hongbin Cao, Jiangsu (CN); Yuxi Zhao, Jiangsu (CN); Jialong Shen, Jiangsu (CN)

(73) Assignee: Suzhou Thor Electronic Technology Co., Ltd., Jiangsu (CN)

( * ) Notice: Subject to any disclaimer, the term of this patent is extended or adjusted under 35 U.S.C. 154(b) by 220 days.

(21) Appl. No.: 18/282,796

(22) PCT Filed: May 12, 2021

(86) PCT No.: PCT/CN2021/093371
§ 371 (c)(1),
(2) Date: Sep. 19, 2023

(87) PCT Pub. No.: WO2022/193426
PCT Pub. Date: Sep. 22, 2022

(65) Prior Publication Data
US 2024/0171901 A1 May 23, 2024

(30) Foreign Application Priority Data
Mar. 19, 2021 (CN) ......................... 202110296488.7

(51) Int. Cl.
*H04R 11/02* (2006.01)
*H04R 1/10* (2006.01)
*H04R 1/28* (2006.01)

(52) U.S. Cl.
CPC ......... *H04R 1/2811* (2013.01); *H04R 1/1008* (2013.01); *H04R 1/1075* (2013.01); *H04R 2460/13* (2013.01)

(58) Field of Classification Search
CPC ...... H04R 1/2896; H04R 11/10; H04R 11/02; H04R 11/06; H04R 2400/07; H04R 2460/13
See application file for complete search history.

(56) References Cited

U.S. PATENT DOCUMENTS 3,919,500 A * 11/1975 Dymoke-Bradshaw ..................... H04R 11/00 381/418
7,827,671 B2 * 11/2010 Hakansson .............. H04R 9/06 607/55
(Continued)

FOREIGN PATENT DOCUMENTS

CN 111083612 4/2020
CN 210781336 6/2020
(Continued)

OTHER PUBLICATIONS

"International Search Report (Form PCT/ISA/210) of PCT/CN2021/093371," mailed on Dec. 14, 2021, with English translation thereof, pp. 1-4.

*Primary Examiner* — Ryan Robinson
(74) *Attorney, Agent, or Firm* — JCIPRNET

(57) ABSTRACT

The application discloses a bone conduction acoustic device and a wearable device, wherein the bone conduction acoustic device comprises an external packaging structure, a hollow cavity is arranged in the external packaging structure, and in the hollow cavity, the following components are arranged: a hollow flexure spring; an actuator, which includes an upper magnetic part and a lower magnetic part, wherein the upper magnetic part and the lower magnetic part are arranged opposite to each other in parallel in the Z-axis direction, and there is a gap to form an isolation area; a spatial low-frequency adjustment plate, which is arranged between the hollow flexure spring and the actuator, wherein
(Continued)

the spatial low-frequency adjustment plate adjusts the stackup of the hollow flexure spring and the actuator in the Z-axis direction, and adjusts the gap in the isolation area.

20 Claims, 3 Drawing Sheets

(56) References Cited

U.S. PATENT DOCUMENTS

| | | | | |
|---|---|---|---|---|
| 7,961,553 | B2 * | 6/2011 | Kang | H04R 1/24 381/151 |
| 7,983,431 | B2 * | 7/2011 | Fukuda | H04R 11/06 381/151 |
| 8,107,648 | B2 * | 1/2012 | Nakatani | H04R 1/1075 381/151 |
| 9,420,379 | B2 * | 8/2016 | Kim | H04R 11/02 |
| 2007/0160238 | A1 * | 7/2007 | Kobayashi | H04R 9/025 381/151 |
| 2009/0285417 | A1 * | 11/2009 | Shin | H04R 9/06 381/151 |
| 2015/0030197 | A1 | 1/2015 | Pavlov et al. | |

FOREIGN PATENT DOCUMENTS

| | | | | |
|---|---|---|---|---|
| CN | 112367596 | | 2/2021 | |
| CN | 111935611 B | * | 4/2022 | H04R 9/06 |
| WO | WO-0219759 A1 | * | 3/2002 | H04R 11/02 |

* cited by examiner

BONE CONDUCTION ACOUSTIC DEVICE AND WEARABLE DEVICE

CROSS-REFERENCE TO RELATED APPLICATION

This application is a 371 of international application of PCT application serial no. PCT/CN2021/093371, filed on May 12, 2021, which claims the priority benefit of China application no. 202110296488.7, filed on Mar. 19, 2021. The entirety of each of the above-mentioned patent applications is hereby incorporated by reference herein and made a part of this specification.

TECHNICAL FIELD

The application relates to the technical field of bone conduction acoustics, in particular to a bone conduction acoustic device and a wearable device.

DESCRIPTION OF RELATED ART

Bone conduction is a sound transmission method, in which sound is converted into mechanical vibrations of different frequencies, and air sound waves are transmitted through the human skull, bone labyrinth, inner ear lymph fluid, spiral organ, and auditory center. Compared with the traditional sound conduction method of generating air sound waves through the acoustic membrane, bone conduction saves many steps of air sound wave transmission, and may achieve clear sound reproduction in noisy environments, and sound waves will not affect others due to diffusion in the air.

Headphones manufactured with bone conduction acoustics are called: bone conduction headphones, in which the conduction of its air sound waves is different from that of ordinary in-ear devices, it does not require the vibration of the eardrum, but directly transmits to the auditory nerve through the bone, which not only improves the comfort, but also protects the user's hearing, and enables the user to hear clearly external sound and has its unique advantages, but the existing bone conduction headphones have the following defects.

When the bone conduction acoustic device used in the existing bone conduction headphones transmits low-frequency signals, it will generate relatively large vibration amplitude, and there will be a strong sense of vibration during use, which will affect the user experience. Therefore, in order to overcome the above-mentioned defects, the headphones will directly Tilt the low-frequency signal in practical applications, and although this reduces the vibration, the sound transmitted to the ear lacks the bass part, and the sound quality is not good, which will also affect user experience sense. Therefore, it is very meaningful to study a bone conduction acoustic device with enrich low-frequency content and improved low-frequency sound quality and sound effect.

SUMMARY

It is an object of the present application to provide a bone conduction acoustic device and a wearable device, which may transmit low-frequency signals with moderate amplitude and equalize the entire sound frequency range.

In order to solve the above-mentioned technical problems, in a first aspect, the technical solution of the present invention is:

a bone conduction acoustic device, comprising an external packaging structure, in which a hollow cavity is arranged, and in the hollow cavity the following components are arranged:

a hollow flexure spring;

an actuator, which includes an upper magnetic part and a lower magnetic part, wherein the upper magnetic part and the lower magnetic part are arranged in parallel and opposite to each other in the Z-axis direction, and there is a gap to form an isolation area;

a spatial low-frequency adjustment plate, which is arranged between the hollow flexure spring and the actuator, wherein the spatial low-frequency adjustment plate adjusts the stackup of the hollow flexure spring and the actuator in the Z-axis direction, and adjusts the gap in the isolation area to adjust the resonance frequency point of the device.

Preferably, the magnetic flux of the lower magnetic part is less than or equal to the magnetic flux of the upper magnetic part, and the actuator further includes an upper magnetic bowl for accommodating the upper magnetic part and a lower magnetic bowl for accommodating the lower magnetic part, the upper magnetic part and the lower magnetic part are arranged with the same pole opposite to each other; when it is not energized, the repulsion force between the upper magnetic part and the lower magnetic part is equal to the attractive force between the upper magnetic part and the lower magnetic bowl to maintain magnetic static balance, to achieve the best fidelity effect.

Preferably, the actuator further comprises a coil installed in the lower magnetic bowl and arranged around the lower magnetic part.

Preferably, the actuator further comprises a flexible circuit board, the flexible circuit board is arranged between the coil and the lower magnetic bowl, one end of the flexible circuit board is connected to the coil, and the other end extends out of the external packaging structure.

Preferably, the lower magnetic bowl is installed at the bottom of the hollow cavity, and the upper magnetic bowl is connected to the spatial low-frequency adjustment plate.

Preferably, the bottom surface area of the lower magnetic bowl is greater than or equal to the bottom surface area of the upper magnetic bowl.

Preferably, the upper magnetic part comprises at least one magnet and/or the lower magnetic part comprises at least one magnet.

Preferably, the isolation area is filled with one or more of air, damping material, and elastic part.

Preferably, the hollow flexure spring comprises an inner flexure spring, an outer flexure spring and a plurality of connection flexure springs connected between the inner flexure spring and the outer flexure spring, and the inner flexure spring is installed on the spatial low-frequency adjustment plate, and the outer flexure spring is installed on the external packaging structure.

Preferably, the external packaging structure comprises a case and a cover plate covering the case, the hollow flexure spring is embedded in the case and arranged opposite to the cover plate.

Preferably, the distance between the cover plate and the hollow flexure spring is greater than the maximum working vibration displacement of the hollow flexure spring.

In a second aspect, the present application also provides a wearable device, comprising the above-mentioned bone conduction acoustic device.

Compared with the prior art, the present application has the following beneficial effects:

(1) In the present application, a spatial low-frequency adjustment plate is arranged between the hollow flexure spring and the actuator, and it may adjust the effective vibration area of the hollow flexure spring through the cooperation of the hollow flexure spring and the spatial low-frequency adjustment plate to adjust the resonance frequency point of the device; at the same time, it may adjust the stackup of the hollow flexure spring and the actuator in the Z-axis direction, and adjust the gap in the isolation area, so that the sound signal transmitted by the sound device has a moderate amplitude, and at the same time, the bass part may be transmitted to the ear canal synchronously, so as to balance the entire sound frequency range, achieve better acoustic effects, and significantly improve user experience and product sound quality.

(2) The actuator uses the upper and lower magnetic parts arranged opposite to each other to achieve the static force balance between the parts by completely using the magnetic force balance, without additional supporting structure and the structure is simple, easy to realize, and reduces production cost.

(3) The external packaging structure is covered with a cover plate, which enhances the strength of the whole device, and at the same time has a good sound insulation effect, effectively preventing the occurrence of sound leakage.

BRIEF DESCRIPTION OF THE DRAWINGS

The drawings described herein are for illustration purposes only and are not intended to limit the scope of the present disclosure in any way. In addition, the shapes and proportional dimensions of the components in the drawings are only schematic and are used to help the understanding of the present application, and do not specifically limit the shapes and proportional dimensions of the components in the present application. In light of the teaching of the present application, those skilled in the art may select various possible shapes and proportional dimensions according to specific conditions to implement the present application. In the attached picture.

The following components are shown in the figure.

11. hollow cavity; 12. case; 13. cover plate; 14. installation groove; 2. hollow flexure spring; 21. inner flexure spring; 22. outer flexure spring; 23. connection flexure spring; 3. spatial low-frequency adjustment plate; 41. upper magnetic part; 41*a*, first magnet; 41*b*, second magnet; 42, lower magnetic part; 43, isolation area; 44, upper magnetic bowl; 45, lower magnetic bowl; 46, coil; 47, flexible circuit board.

DESCRIPTION OF THE EMBODIMENTS

In order to enable those skilled in the art to better understand the technical solutions in the present application, the technical solutions in the embodiments of the present application will be clearly and completely described below in conjunction with the drawings in the embodiments of the present application. Apparently, the described embodiments are only some of the embodiments of the present application, but not all of them. Based on the embodiments of the present application, all other embodiments obtained by the skilled in the art without making inventive efforts shall fall within the protection scope of the present application.

It should be noted that when an element is referred to as being "disposed on" another element, it may be directly on the other element or there may also be an intervening element. When an element is referred to as being "connected to" another element, it may be directly connected to the other element or intervening elements may also be present. The terms "vertical," "horizontal," "left," "right," and similar expressions are used herein for purposes of illustration only and are not intended to represent the only embodiments.

Unless otherwise defined, all technical and scientific terms used herein have the same meaning as commonly understood by the skilled in the technical field of the application. The terms used herein in the description of the present application are for the purpose of describing specific embodiments only, and are not intended to limit the present application. As used herein, the term "and/or" includes any and all combinations of one or more of the associated listed items.

Figure 1:
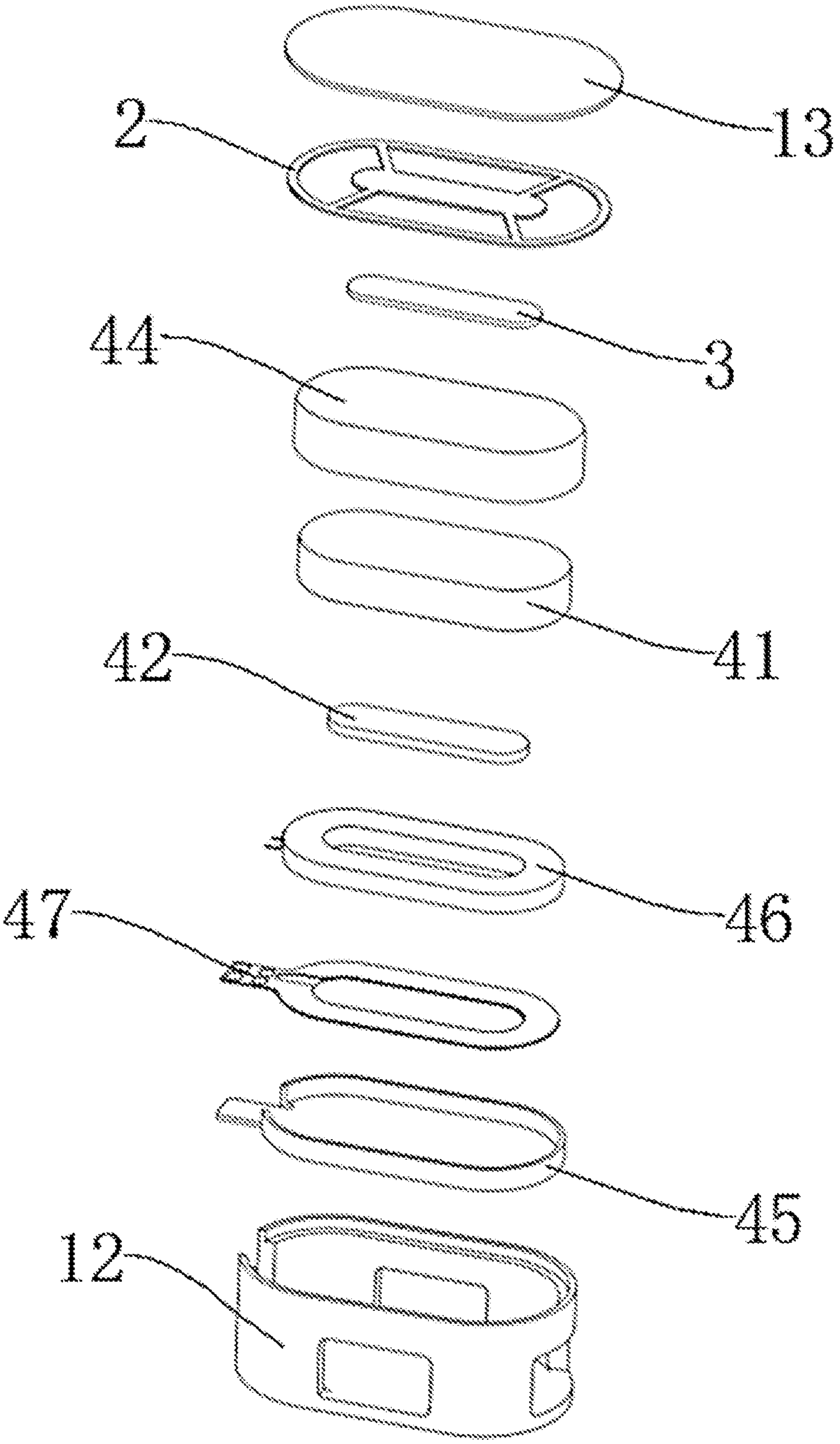
FIG. 1 is an exploded schematic diagram of a bone conduction acoustic device in the present application.
Figure 2:
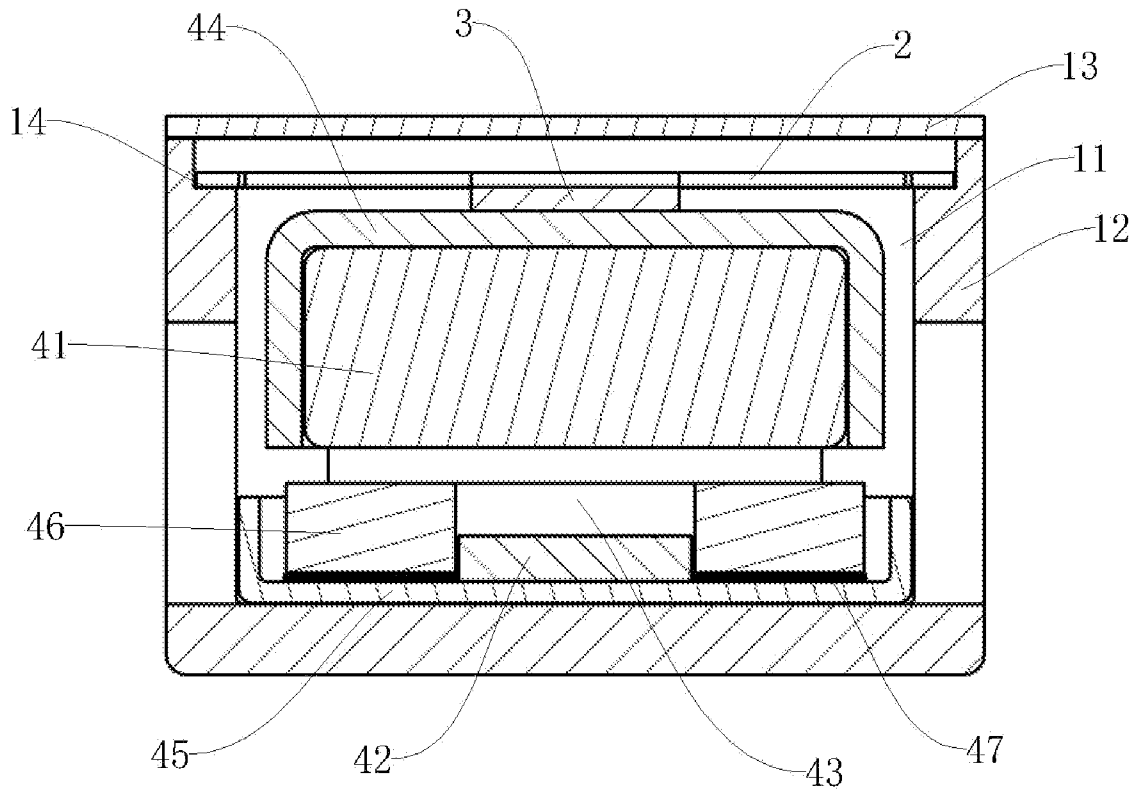
FIG. 2 is a sectional schematic diagram of the bone conduction acoustic device of the present application.

As shown in FIG. 1 and FIG. 2, the bone conduction acoustic device corresponding to a preferred embodiment of the present application comprises the external packaging structure, the hollow flexure spring 2, the spatial low-frequency adjustment plate 3 and the actuator. The hollow cavity 11 is provided in the external packaging structure, and the hollow flexure spring 2, the spatial low-frequency adjustment plate 3 and the actuator are arranged in the hollow cavity 11. The actuator drives the flexure spring 2 to vibrate, and the actuator comprises the upper magnetic part 41 and the lower magnetic piece 42, the upper magnetic part 41 and the lower magnetic part 42 are arranged opposite to each other in parallel in the Z-axis direction, and there is a gap to form the isolation zone 43; the spatial low-frequency adjustment plate 3 is arranged between the hollow flexure spring 2 and the actuator, the spatial low-frequency adjustment plate 3 adjusts the stackup of the hollow flexure spring 2 and the actuator in the Z-axis direction, and adjusts the gap in the isolation area 43, the hollow flexure spring 2 collaborates with the spatial low-frequency adjustment plate 3 to adjust the effective vibration area of the hollow flexure spring 2 to adjust the resonance frequency point of the device.

Figure 4:
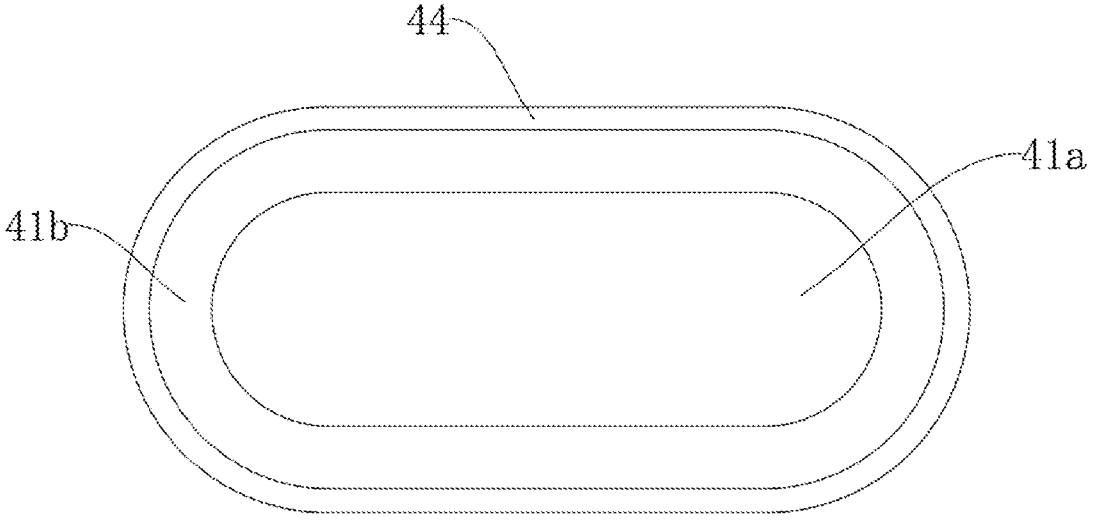
FIG. 4 is a schematic structural diagram of an upper magnetic part in an embodiment of the present application.

Further, the actuator also comprises the upper magnetic bowl 44 for receiving the upper magnetic part 41, the lower magnetic bowl 45 for receiving the lower magnetic part 42, the coil 46 installed in the lower magnetic bowl 45 and arranged around the lower magnetic part 42, and the flexible circuit board 47 arranged between the coil 46 and the lower magnetic bowl 45. The upper magnetic bowl 44 is connected to the spatial low-frequency adjustment plate 3, and the lower magnetic bowl 45 is installed at the bottom of the hollow cavity 11; specifically, the upper magnetic part 41 is installed in the upper magnetic bowl 44. After the coil 46 is energized, different magnetic fields are generated to cooperate with the upper magnetic part 41 to provide driving force for the vibration of the hollow flexure spring 2, and the two components are fitted without gap there between or there is only an assembly space; compared with the traditional actuator, there is no need to reserve an acoustic coil insertion space, which reduces the volume of the entire acoustic device. The upper magnetic part 41 comprises at least one magnet, which may be a whole magnet, or a plurality of magnets stacked and spliced together. As shown in FIG. 4, in a preferred embodiment, the upper magnetic part 41 comprises two magnets, namely the first magnet 41*a* and the second magnet 41*b* surrounding the first magnet 41*a*. The lower magnetic component 42 is installed in the lower magnetic bowl 45, and the repulsive force between the upper magnetic component 41 and the lower magnetic component 42 counteracts the attraction force between the upper magnetic part 41 and the lower magnetic bowl 45, so that the actuator is in the static balance of magnetic force when it is not energized, avoiding the internal stress generated by the hollow flexure spring 42. The lower magnetic part 42 comprises at least one magnet, which may be a whole magnet, or a plurality of magnets stacked and spliced together. The coil 46 is installed in the lower magnetic bowl 45 and arranged around the lower magnetic part 42. Preferably, the hollow area of the coil 46 is less than or equal to the area of the upper magnetic part 41 corresponding to the coil 46, the area of the lower magnetic part 42 is smaller than the area of the hollow part of the coil 46, and the surface area of the bottom of the lower magnetic bowl 45 is greater than or equal to the surface area of the bottom of the lower magnetic bowl 45, and the magnetic flux of the lower magnetic part 42 are less than or equal to the magnetic flux of the upper magnetic part 41, and the magnetic flux here may be changed by changing the volume or material of the magnetic part. The flexible circuit board 47 is arranged between the coil 46 and the lower magnetic bowl 45, one end of which is connected to the coil 46, and the other end passes through the lower magnetic bowl 45 and the case 12 once and extends to the outside to connect with the terminal device. The upper magnetic part 41 and the lower magnetic part 42 are arranged with the same pole opposed to each other; when it is not energized, the repulsion force between the upper magnetic part 41 and the lower magnetic part 42 is equal to the attraction force between the upper magnetic part 41 and the lower magnetic bowl 45 to achieve the static balance of the magnetic force, which may avoid the internal stress of the hollow flexure spring 2 and achieves the best fidelity effect. When the coil 46 is energized, the magnetic static balance is broken, and the upper magnetic bowl 44 installed on the hollow flexure spring 2 moves up and down, bringing the hollow flexure spring 2 to vibrate up and down. It is worth noting that no matter how the upper magnetic bowl 44 moves up and down, the isolation area 43 between the upper magnetic part 41 and the lower magnetic part 42 always exists, that is, when the upper magnetic bowl 44 vibrates downward to the maximum, the upper magnetic part 41 will not touch the second magnet 42 and the coil 46 to hinder the movement.

The spatial low-frequency adjustment plate 3 is connected between the hollow flexure spring 2 and the upper magnetic bowl 44, so that it is possible that the hollow flexure spring 2 is not attached in its entirety to the upper magnetic bowl 44, and the stackup in the Z direction may be adjusted freely, and in addition, the size of the isolation area between the upper magnetic part 41 and the lower magnetic part 42 may be adjusted. The hollow flexure spring 2 cooperates with the spatial low-frequency adjustment plate 3 to adjust the effective vibration area of the hollow flexure spring 2 to adjust the resonant frequency point of the device. Specifically, under the condition that the overall size, thickness and material of the hollow flexure spring 2 remain unchanged, the length, width and area of the inner flexure spring 21 are changed, thereby changing the length and area of the connecting flexure spring 23 between the inner flexure spring 21 and the outer flexure spring 22, and the length and area of the connecting flexure spring 23 are the effective vibration area of the hollow flexure spring, thereby changing the resonance frequency point F0 of the system, and flexibly adjusting the low-frequency effect; the minimum resonance frequency point may reach 80 Hz; at the same time, the spatial low-frequency adjustment plate 3 changes with the change of the length, width and area of the inner flexure spring 21; since the change of F0 will lead to a change in the amplitude, the height of the adjustment plate also needs to be adjusted accordingly to completely connect the hollow flexure spring 2 and the Z direction stackup of the upper magnetic bowl 44. The isolation area 43 is filled with one or more of air, damping material, and other elastic elements, which may be magnetic fluid, foam, spring, and the like.

Figure 3:
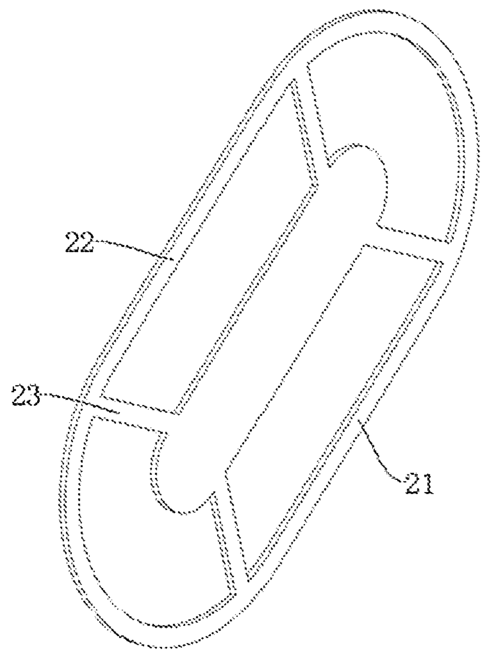
FIG. 3 is a schematic structural diagram of the hollow flexure spring in the present application.

As shown in FIG. 3, the hollow flexure spring 2 comprises the inner flexure spring 21, the outer flexure spring 22, and a plurality of connection flexure springs 23 connected between the inner flexure spring 21 and the outer flexure spring 22, the size of the inner flexure spring 21 is equal to the spatial low-frequency adjustment plate 3 and installed on the spatial low-frequency adjustment plate 3, the outer flexure spring 22 is installed on the external packaging structure. Specifically, the external packaging structure comprises a case 12 and a cover plate 13 covering the case 12, and the hollow flexure spring 2 is embedded in the case 12 and is arranged opposite to the cover plate 13. In order to further better fix the hollow flexure spring 2, the case 12 is provided with the installation groove 14 at the opening end of the hollow cavity 11, and the hollow flexure spring 2 is embedded in the installation groove 14, that is, the outer flexure spring 22 is installed in the installation groove, the inner flexure spring 21 is installed on the spatial low-frequency adjustment plate 3, and the connection flexure spring 23 is always separated from the upper magnetic bowl 44 to ensure that the hollow flexure spring 2 may generate vibration.

In order to further ensure the strength of the entire acoustic device and the sound insulation effect, the cover plate 13 is covered on the installation groove 14, and the cover plate 13 cooperates with the installation groove 14 and closes the hollow cavity 11. The cover plate 13 is preferably made of metal material, and it has good rigidity and no deformation, and the distance between the cover plate 12 and the hollow flexure spring 2 is greater than the operating maximum vibration displacement of the hollow flexure spring 2 to ensure that the vibration may be carried out normally.

The embodiment of the present application also provides a wearable device, which is equipped with the above-mentioned bone conduction acoustic device, and the wearable device may be headphones, wearable glasses, AR, MR, etc., and it may transmit low-frequency signals and the transmitted amplitude is moderate to balance the entire sound band.

In the bone conduction acoustic device and the wearable device of the present application, between the hollow flexure spring and the actuator a spatial low-frequency adjustment plate is set, which may adjust the stackup of the hollow flexure spring and the actuator in the Z-axis direction, and adjust the gap in the isolation area to adjust the resonance frequency point. So that the sound signal transmitted by the sound device has a moderate amplitude, and at the same time, the bass part may be transmitted to the ear canal synchronously, so as to balance the entire sound frequency range, achieve better acoustic effects, and significantly improve user experience and product sound quality; the actuator uses the upper and lower magnetic parts arranged with the same pole opposite to each other to achieve the static balance between the parts by completely using the magnetic force balance, without additional support structure and the structure is simple, easy to realize, and reduces production cost. The external packaging structure is covered with a cover plate, which enhances the strength of the whole device, and at the same time has a good sound insulation effect, effectively preventing the occurrence of sound leakage.

It should be understood that the above description is for purposes of illustration and not limitation. Many embodiments and many applications other than the examples provided will be apparent to the skilled in the art from reading the above description. The scope of the present teachings, therefore, should be determined not with reference to the above description, but should be determined with reference to the full scope of the preceding claims and equivalents to these claims. The disclosures of all articles and references, including patent applications and publications, are incorporated herein by reference for completeness. The omission from the preceding claims of any aspect of the subject matter disclosed herein is neither intended to be a waiver of such subject matter, nor should it be considered that the applicant did not consider the subject matter to be part of the disclosed subject matter of the invention.

What is claimed is:

1. A bone conduction acoustic device, comprising an external packaging structure, a hollow cavity is arranged in the external packaging structure, wherein the hollow cavity is arranged with:

a hollow flexure spring;

an actuator, comprising an upper magnetic part and a lower magnetic part, wherein the upper magnetic part and the lower magnetic part are arranged opposite to each other in parallel in a Z-axis direction, and a gap exists between the upper magnetic part and the lower magnetic part to form an isolation area;

a spatial low-frequency adjustment plate, arranged between the hollow flexure spring and the actuator, wherein the spatial low-frequency adjustment plate adjusts a stackup of the hollow flexure spring and the actuator in the Z-axis direction, and adjusts the gap of the isolation area, wherein the hollow flexure spring cooperates with the spatial low-frequency adjustment plate to adjust an effective vibration area of the hollow flexure spring to adjust a resonance frequency point of the bone conduction acoustic device.

2. The bone conduction acoustic device of claim 1, wherein a magnetic flux of the lower magnetic part is less than or equal to a magnetic flux of the upper magnetic part, and the actuator further comprises an upper magnetic bowl for accommodating the upper magnetic part and a lower magnetic bowl for accommodating the lower magnetic part, the upper magnetic part and the lower magnetic part are arranged with same poles opposite to each other; when the acoustic device is not energized, a repulsion force between the upper magnetic part and the lower magnetic part is equal to an attractive force between the upper magnetic part and the lower magnetic bowl to maintain magnetic static balance.

3. The bone conduction acoustic device of claim 2, wherein the actuator further comprises a coil installed in the lower magnetic bowl and arranged around the lower magnetic part.

4. The bone conduction acoustic device of claim 3, wherein the actuator further comprises a flexible circuit board, the flexible circuit board is arranged between the coil and the lower magnetic bowl, one end of the flexible circuit board is connected to the coil, and another end extends out of the external packaging structure.

5. The bone conduction acoustic device of claim 2, wherein the lower magnetic bowl is installed at a bottom of the hollow cavity, and the upper magnetic bowl is connected to the spatial low-frequency adjustment plate.

6. The bone conduction acoustic device of claim 2, wherein a bottom surface area of the lower magnetic bowl is greater than or equal to a bottom surface area of the upper magnetic bowl.

7. The bone conduction acoustic device of claim 1, wherein the upper magnetic part comprises at least one magnet and/or the lower magnetic part comprises at least one magnet.

8. The bone conduction acoustic device of claim 1, wherein the isolation area is filled with one or more of air, a damping material, and an elastic part.

9. The bone conduction acoustic device of claim 1, wherein the hollow flexure spring comprises an inner flexure spring, an outer flexure spring and a plurality of connection flexure springs connected between the inner flexure spring and the outer flexure spring, and the inner flexure spring is installed on the spatial low-frequency adjustment plate, and the outer flexure spring is installed on the external packaging structure.

10. The bone conduction acoustic device of claim 1, wherein the external packaging structure comprises a case and a cover plate covering the case, the hollow flexure spring is embedded in the case and arranged opposite to the cover plate.

11. The conduction acoustic device of claim 10, wherein a distance between the cover plate and the hollow flexure spring is greater than a maximum operating vibration displacement of the hollow flexure spring.

12. A wearable device, comprising the bone conduction acoustic device of claim 1.

13. A wearable device, comprising the bone conduction acoustic device of claim 2.

14. A wearable device, comprising the bone conduction acoustic device of claim 3.

15. A wearable device, comprising the bone conduction acoustic device of claim 4.

16. A wearable device, comprising the bone conduction acoustic device of claim 5.

17. A wearable device, comprising the bone conduction acoustic device of claim 6.

18. A wearable device, comprising the bone conduction acoustic device of claim 7.

19. A wearable device, comprising the bone conduction acoustic device of claim 9.

20. A wearable device, comprising the bone conduction acoustic device of claim 10.

* * * * *